(12) United States Patent
Pentia

(10) Patent No.: US 11,673,521 B2
(45) Date of Patent: Jun. 13, 2023

(54) BODY REAR STRUCTURE OF A BATTERY ELECTRIC MOTOR VEHICLE

(71) Applicant: Dr. Ing. h.c. F. Porsche Aktiengesellschaft, Stuttgart (DE)

(72) Inventor: Bogdan Pentia, Ostfildern (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 113 days.

(21) Appl. No.: 17/471,421

(22) Filed: Sep. 10, 2021

(65) Prior Publication Data

US 2022/0089112 A1   Mar. 24, 2022

(30) Foreign Application Priority Data

Sep. 23, 2020 (DE) ............ 10 2020 124 733.8

(51) Int. Cl.
| | |
|---|---|
| *B60R 19/18* | (2006.01) |
| *B60R 19/03* | (2006.01) |
| *B60R 19/24* | (2006.01) |
| *B60R 19/48* | (2006.01) |

(52) U.S. Cl.
CPC ............ *B60R 19/18* (2013.01); *B60R 19/03* (2013.01); *B60R 19/24* (2013.01); *B60R 19/483* (2013.01)

(58) Field of Classification Search
CPC ......... B60R 19/18; B60R 19/03; B60R 19/24; B60R 19/483
See application file for complete search history.

(56) References Cited

U.S. PATENT DOCUMENTS 7,093,866 B2   8/2006   Toneatti et al.

FOREIGN PATENT DOCUMENTS

| CN | 207274602 U | * | 4/2018 |
|---|---|---|---|
| DE | 602004009004 T2 | | 6/2008 |
| DE | 102011101571 A1 | | 11/2012 |
| DE | 102016110901 A1 | | 12/2017 |

OTHER PUBLICATIONS

CN-207274602-U computer translation (Year: 2018).*

* cited by examiner

*Primary Examiner* — Dennis H Redder
*Assistant Examiner* — Melissa Ann Bonifazi
(74) *Attorney, Agent, or Firm* — RatnerPrestia

(57) ABSTRACT

A body rear structure of a battery electric motor vehicle includes a rear bottom part. A bottom side of the body rear structure has at least one plastics sacrificial part which is fastened to the rear bottom part and extends downwards away from the rear bottom part and which is so configured that it forms a deformation element in the event of mechanical contact with a wheel stop at an electric charging station.

9 Claims, 1 Drawing Sheet

BODY REAR STRUCTURE OF A BATTERY ELECTRIC MOTOR VEHICLE

CROSS-REFERENCE TO RELATED APPLICATION

This application claims priority to German Patent Application No. 10 2020 124 733.8, filed Sep. 23, 2020, the content of such application being incorporated by reference herein in its entirety.

FIELD OF INVENTION

The present invention relates to a body rear structure of a battery electric motor vehicle, which structure comprises a rear bottom part.

BACKGROUND OF THE INVENTION

There are many different installation sites for an electric machine and the electric charging system, including a charging interface, of a battery electric motor vehicle. For example, the electric machine can be accommodated in a rear region of the battery electric motor vehicle. It is then often appropriate likewise to provide the electric charging interface in the rear region of the battery electric motor vehicle.

In some countries it is a legal obligation to provide so-called wheel stops (e.g., parking stop, parking barriers or curbs that are mounted to the ground) in front of the charging stations in public charging devices. For example, in some states in the USA, a wheel stop with a height of slightly more than 15 cm (6") is required by law. Comparable requirements exist in other countries, such as, for example, in the People's Republic of China or in the United Arab Emirates.

When a battery electric motor vehicle with an electric machine accommodated in the rear region and optionally with a charging interface provided in the rear region reverses towards a charging station with a wheel stop arranged in front of it, there is the problem that, for example, the electric machine, or the associated unit mount, the rear bottom part, a rear diffuser provided on the body rear structure or other components can be damaged in the event of mechanical contact with the wheel stop. Whether mechanical contact actually occurs when the vehicle runs into the wheel stop depends on many different boundary conditions. Mention may be made in this context of, for example, the rim diameter of the rear wheels, the chassis height and the loading condition of the battery electric motor vehicle. Furthermore, in the interest of safety, a certain chassis height tolerance should always be taken into account.

In order to avoid contact of the battery electric vehicle with the wheel stop, optical and/or acoustic sensor means can be provided which generate a corresponding warning message for the driver as the battery electric motor vehicle approaches the wheel stop. A predictive warning can take place, for example, on the basis of GPS.

Furthermore, structural measures can be taken which change the vehicle geometry such that contact with the wheel stop can reliably be avoided from the outset. However, sufficient degrees of freedom to allow the vehicle geometry to be correspondingly adapted are often not available.

DE 10 2011 101 571 A1, which is incorporated by reference herein, discloses an anti-collision device for vehicles, in particular for buses, which has removable collision shoes which are arranged in all four corner regions of the vehicle. It is thereby possible, for example, to avoid damage to low-level parts of the vehicle in the event of a collision of the vehicle with curbsides. For a substantially identical purpose, DE 10 2016 110 901 A1, which is incorporated by reference herein, discloses a resilient skid which is loosely suspended from a longitudinal member of the vehicle by means of a latching hook.

SUMMARY OF THE INVENTION

Described herein is a body rear structure of a battery electric motor vehicle of the type mentioned at the beginning whereby particularly expensive damage can effectively be prevented in the event of mechanical contact of the body rear structure with a wheel stop of an electric charging station.

A body rear structure according to aspects of the invention of a battery electric motor vehicle is distinguished in that there is arranged on a bottom side of the body rear structure at least one plastics sacrificial part which is fastened to the rear bottom part and extends downwards away from the rear bottom part and which is so configured that it forms a deformation element in the event of mechanical contact with a wheel stop of an electric charging station. The plastics sacrificial part provided according to aspects of the invention is so arranged that, as the battery electric vehicle approaches a wheel stop of a charging station, the plastics sacrificial part comes into contact with the wheel stop first and thereby forms a deformation element which is reversibly deformed or irreversibly damaged by the contact. As a result, it is possible to prevent other components of the body rear structure, such as, for example, the rear bottom part or a rear diffuser, or the electric machine, a unit mount or parts of an electric charging system of the battery electric vehicle or further components in the underbody region of the vehicle which are likewise expensive to replace, from being damaged by a collision with the wheel stop. Compared to the other components mentioned above, the plastics sacrificial part can be replaced very simply and inexpensively after being irreversibly damaged by contact with the wheel stop of a charging station.

In order to achieve simple mounting and secure holding of the plastics sacrificial part, it is proposed in a preferred embodiment that the plastics sacrificial part is clipped and/or screwed and/or adhesively bonded to the rear bottom part.

In one embodiment, the plastics sacrificial part can be a one-component plastics part. In an alternative embodiment, it is also possible that the plastics sacrificial part is a two-component plastics part. For example, these two plastics components can be a polypropylene with a talc filler of 20% by weight (PP T-20) and a thermoplastic elastomer (TPE).

In one embodiment it can be provided that the plastics sacrificial part has a number n≥1 of predetermined breaking points. The plastics sacrificial part can purposively break at these predetermined breaking points in the event of contact with a wheel stop.

In order to signal to the driver of the battery electric vehicle that he is approaching a wheel stop of a charging station, it is possible in an advantageous embodiment that the body rear structure has a proximity sensor means which is mounted on the plastics sacrificial part.

In a further embodiment it can be provided that the plastics sacrificial part has a wire strain gauge. This wire strain gauge deforms immediately upon contact of the plastics sacrificial part with a wheel stop of a charging station. The deformation can be signaled to the driver in a suitable manner, in particular optically and/or acoustically.

In an advantageous embodiment it is proposed that the plastics sacrificial part is arranged in a bottom corner region of the body rear structure.

In order to improve the collision protection further, it can be provided in a particularly advantageous embodiment that a plastics sacrificial part is arranged in each of the two mutually opposite, bottom corner regions of the body rear structure.

According to a further aspect, the present invention relates to a battery electric motor vehicle having a body rear structure.

BRIEF DESCRIPTION OF THE DRAWINGS

Further features and advantages of the present invention will become apparent from the following description of a preferred exemplary embodiment with reference to the accompanying figures, in which.

DETAILED DESCRIPTION OF THE INVENTION

Figure 1:
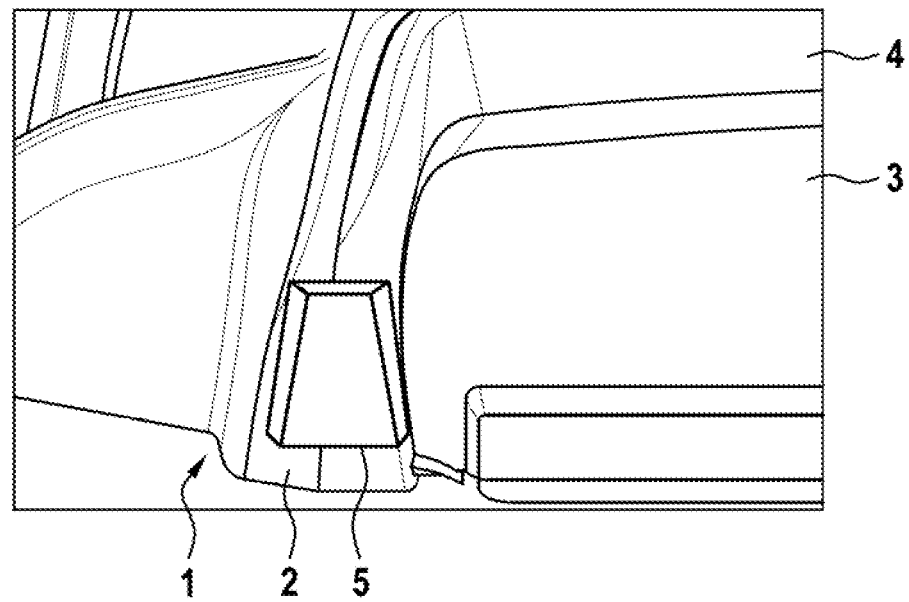
FIG. 1 is a bottom view of part of a body rear structure of a motor vehicle.
Figure 2:
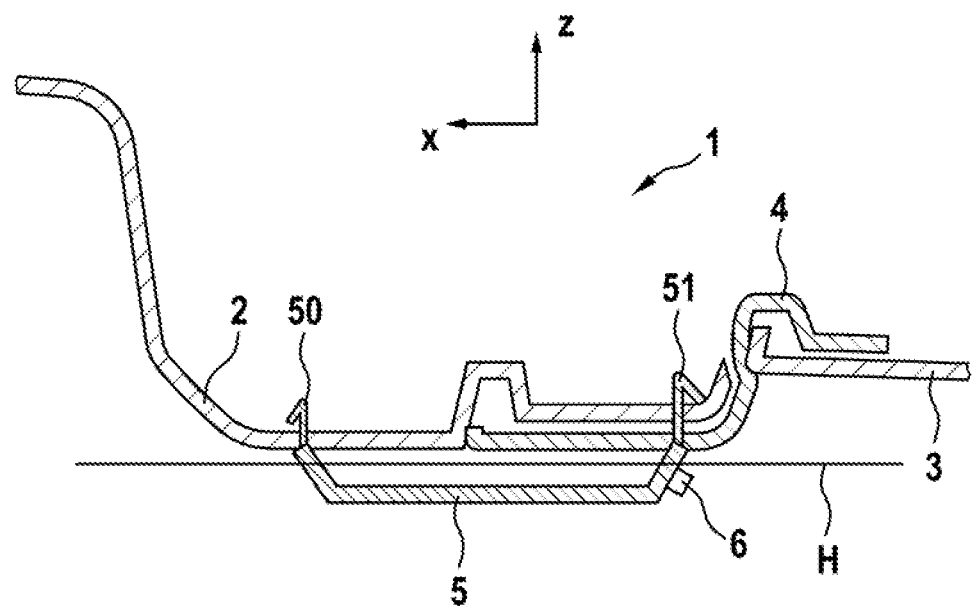
FIG. 2 is a sectional view of the part of the body rear structure shown in FIG. 1, wherein the sectional plane is the x-z plane.

Referring to FIGS. 1 and 2, a body rear structure 1 of a battery electric motor vehicle, in the rear region of which there are accommodated the electric machine and optionally also the electric charging system, has a rear bottom part 2 and a rear diffuser 3. There can further be seen in the two figures part of a rear paneling 4 of the body rear structure 1. A cartesian coordinate system has further been indicated in FIG. 2, wherein the x-axis defines the vehicle longitudinal direction and the z-axis represents the vehicle vertical direction.

FIG. 1 shows a first of two mutually opposite, bottom corner regions of the body rear structure 1, on which there is arranged a plastics sacrificial part 5 which is fastened to the rear bottom part 2. Preferably, such a plastics sacrificial part 5 is provided on each of the two mutually opposite corner regions of the body rear structure 1. The plastics sacrificial part 5 can be, for example, a one-component plastics part. In an alternative embodiment it is also possible that the plastics sacrificial part 5 is a two-component plastics part. For example, these two plastics components can be a polypropylene with a talc filler of 20% by weight (PP T-20) and a thermoplastic elastomer (TPE). The plastics sacrificial part 5 can be clipped and/or screwed and/or adhesively bonded to the rear bottom part 2. In the present case, two latching hooks 50, 51 are provided, which are formed integrally with the plastics sacrificial part 5 and, on mounting, engage into corresponding latching openings of the rear bottom part 2.

The plastics sacrificial part 5 extends downwards away from the rear bottom part 2 and forms a mechanical deformation element for a wheel stop of an electric charging station, if the body rear structure 1 of the battery electric motor vehicle collides with the wheel stop. The height level H of the wheel stop has been graphically represented in FIG. 2.

The plastics sacrificial part 5 provided in the body rear structure 1 presented here is so arranged that, as the battery electric motor vehicle approaches a wheel stop of an electric charging station, the plastics sacrificial part comes into contact with the wheel stop first and is thereby reversibly deformed or in some circumstances also irreversibly damaged, so that it must be replaced. As a result, it is possible to prevent other components of the body rear structure 1, such as, for example, the rear bottom part 2 or the rear diffuser 3, or the electric machine, a unit mount of the electric machine or parts of an electric charging system of the battery electric motor vehicle or further components in the underbody region of the vehicle which are comparatively expensive to replace, from being damaged by a collision with the wheel stop. Compared to the other components mentioned above, the plastics sacrificial part 5 can be replaced very simply is and inexpensively after being irreversibly damaged by contact with the wheel stop of a charging station.

In order to signal to the driver of the battery electric vehicle that he is approaching a wheel stop, the body rear structure 1 can have—as is shown in FIG. 2—a proximity sensor means 6 which is mounted on the plastics sacrificial part 5. The signals of the proximity sensor means 6 are processed in a suitable manner so that they can signal to the driver optically and/or visually, for example, that he is approaching the wheel stop.

In a further embodiment it can be provided that the plastics sacrificial part 5 has a wire strain gauge. This wire strain gauge deforms immediately upon contact of the plastics sacrificial part 5 with a wheel stop of a charging station. This deformation can be signaled to the driver in a suitable manner, in particular optically and/or visually.

What is claimed is:

1. A body rear structure of a battery electric motor vehicle, said body rear structure comprising:
   a rear bottom part,
   at least one plastic sacrificial part arranged on a bottom side of the body rear structure and fastened to the rear bottom part,
   wherein the at least one plastic sacrificial part extends downwards and away from the rear bottom part and is configured to deform in the event of mechanical contact with a wheel stop at an electric charging station,
   wherein the plastic sacrificial part is arranged in a bottom corner region of the body rear structure.

2. The body rear structure as claimed in claim 1, wherein the plastic sacrificial part is clipped, screwed and/or adhesively bonded to the rear bottom part.

3. The body rear structure as claimed in claim 1, wherein the plastic sacrificial part is a one-component plastics part.

4. The body rear structure as claimed in claim 1, wherein the plastic sacrificial part is a two-component plastic part.

5. The body rear structure as claimed in claim 1, wherein the plastics sacrificial part has one or more predetermined breaking points.

6. A motor vehicle comprising the body rear structure of claim 1.

7. A body rear structure of a battery electric motor vehicle, said body rear structure comprising:
   a rear bottom part;
   at least one plastic sacrificial part arranged on a bottom side of the body rear structure and fastened to the rear bottom part, wherein the at least one plastic sacrificial part extends downwards and away from the rear bottom part and is configured to deform in the event of mechanical contact with a wheel stop at an electric charging station; and
   a proximity sensor mounted on the plastic sacrificial part for detecting the wheel stop.

8. A body rear structure of a battery electric motor vehicle, said body rear structure comprising:

a rear bottom part; and at least one plastic sacrificial part arranged on a bottom side of the body rear structure and fastened to the rear bottom part, wherein the at least one plastic sacrificial part extends downwards and away from the rear bottom part and is configured to deform in the event of mechanical contact with a wheel stop at an electric charging station, and wherein the plastic sacrificial part has a wire strain gauge.

9. A body rear structure of a battery electric motor vehicle, said body rear structure comprising:

a rear bottom part;

two plastic sacrificial parts arranged on a bottom side of the body rear structure and fastened to the rear bottom part, wherein each plastic sacrificial part extends downwards and away from the rear bottom part and is configured to deform in the event of mechanical contact with a wheel stop at an electric charging station, and wherein the two plastic sacrificial parts are arranged in two mutually opposite, bottom corner regions of the body rear structure.

\* \* \* \* \*